March 19, 1946.    J. J. CORRIGAN ET AL    2,396,941
WORK SUPPORT FOR MACHINE TOOLS
Filed Nov. 19, 1943    3 Sheets-Sheet 1
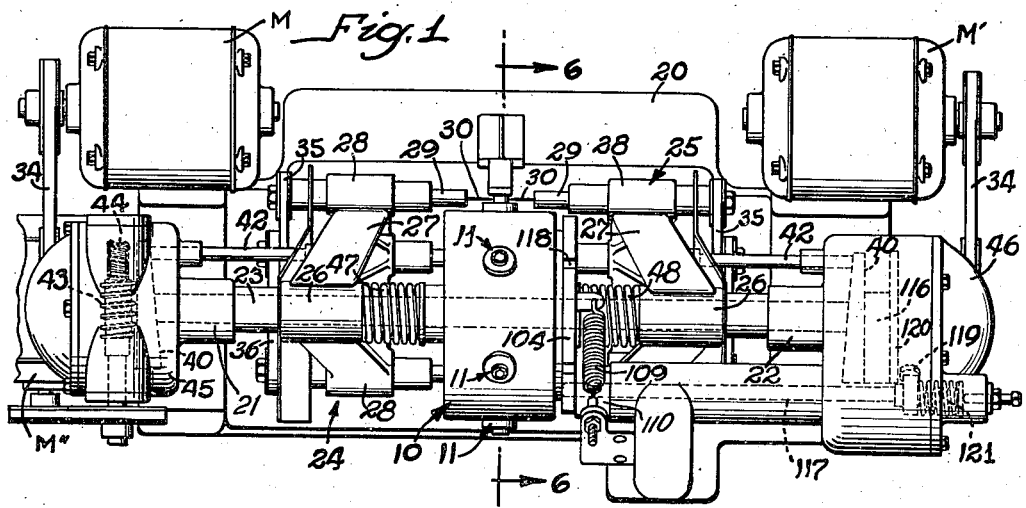
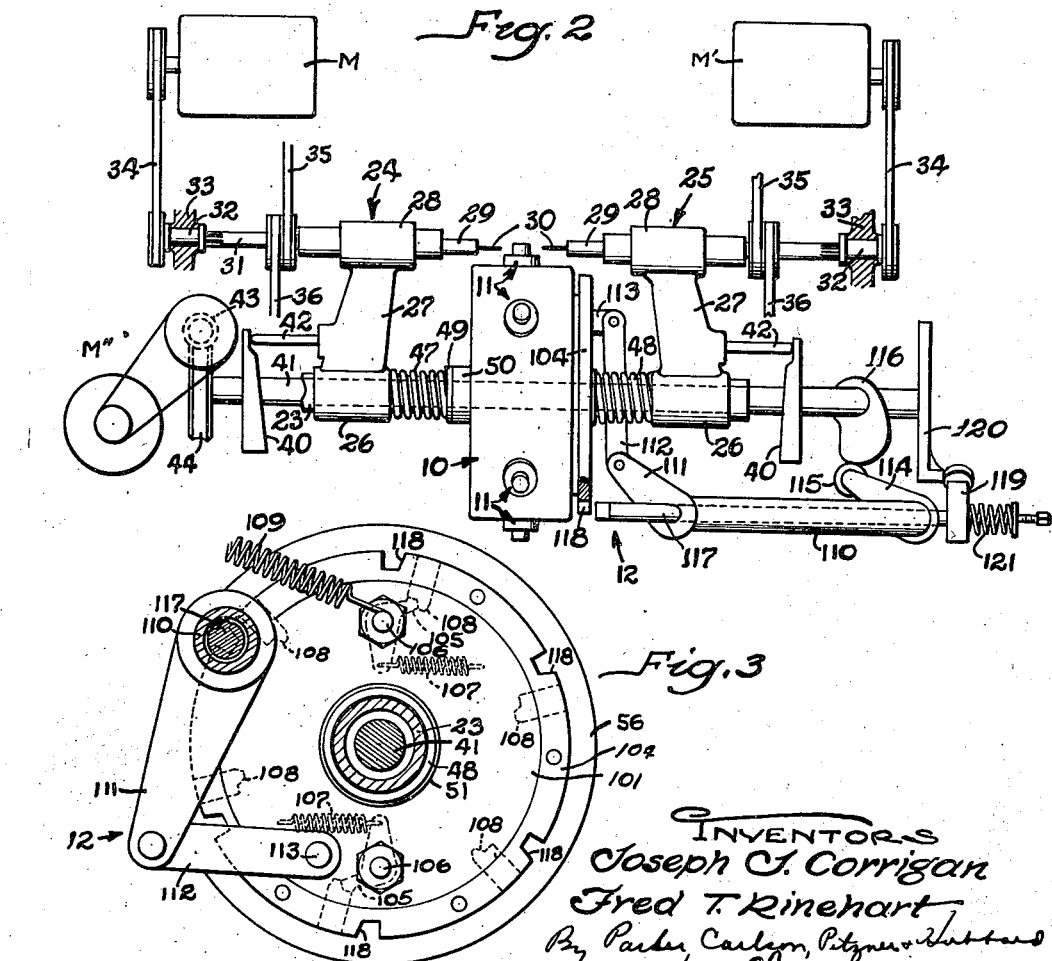
INVENTORS
Joseph J. Corrigan
Fred T. Rinehart
By Parker, Carlson, Pitzner & Hubbard
ATTORNEYS

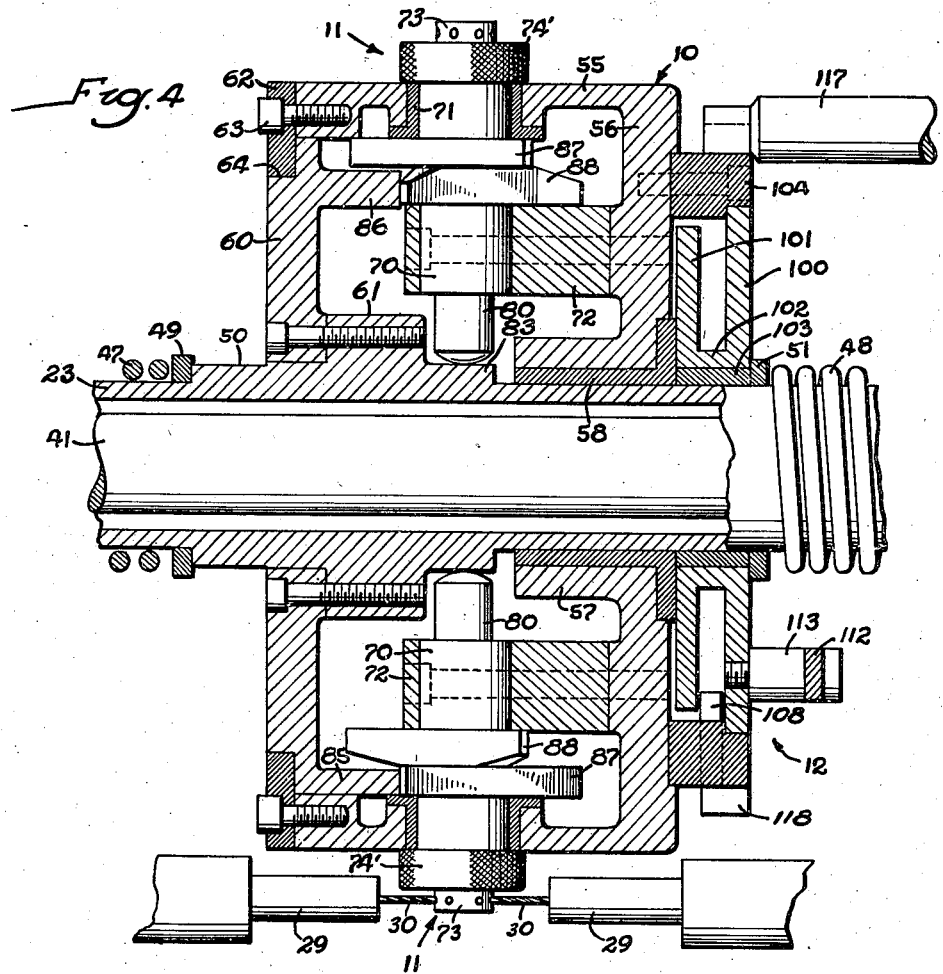
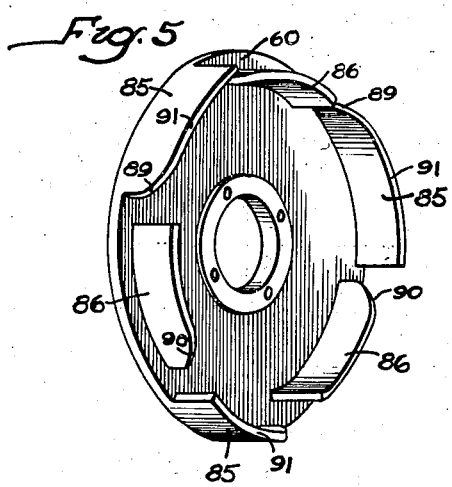

March 19, 1946.  J. J. CORRIGAN ET AL  2,396,941
WORK SUPPORT FOR MACHINE TOOLS
Filed Nov. 19, 1943  3 Sheets-Sheet 3
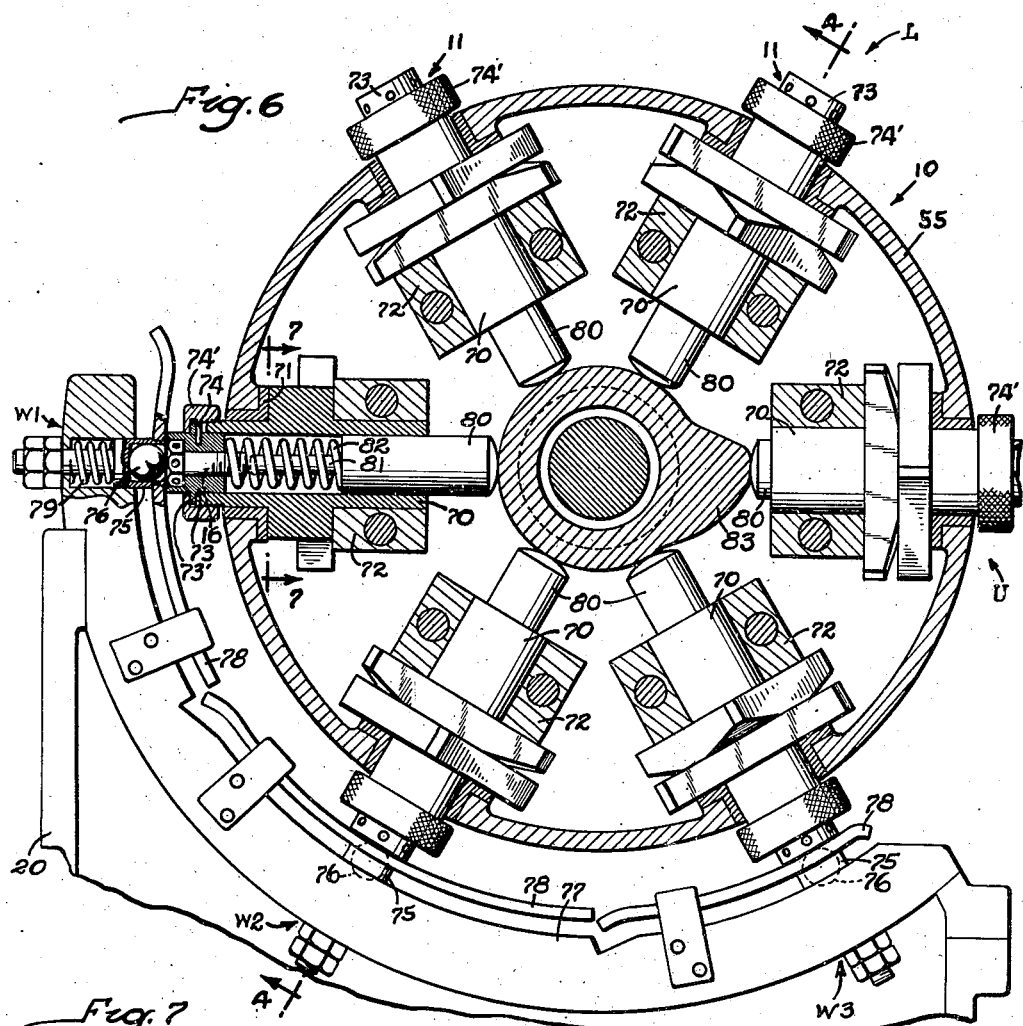
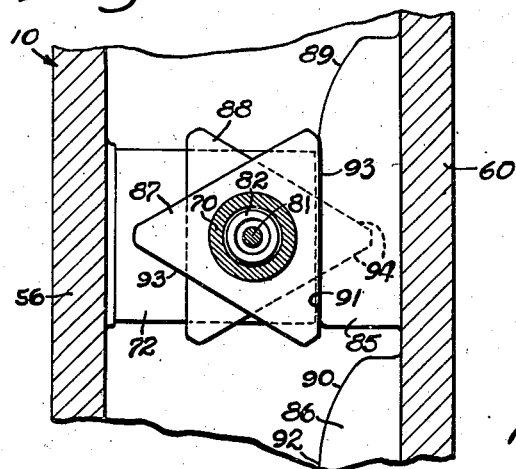
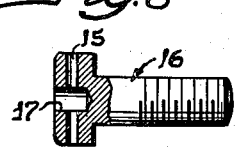
INVENTORS
Joseph J. Corrigan
Fred T. Rinehart
By Parker, Carlson, Pitzner & Hubbard
ATTORNEYS Patented Mar. 19, 1946

2,396,941

UNITED STATES PATENT OFFICE 2,396,941

WORK SUPPORT FOR MACHINE TOOLS

Joseph J. Corrigan and Fred T. Rinehart,
Loves Park, Ill.

Application November 19, 1943, Serial No. 510,860

6 Claims. (Cl. 77—64)

The invention relates to work supports for machine tools and more particularly to rotary work supports of the type adapted to be indexed through successive stations.

One object of the invention is to provide a work support of the above general character adapted to present a different side of a workpiece for operation at each of a plurality of stations and to lock the workpiece in a fixed position while a machining operation is performed thereon.

Another object is to provide novel mechanism for advancing a plurality of workpieces step-by-step through a series of working stations, for turning the workpieces through a predetermined angle in their passage from one station to another, and for holding the workpieces against rotation while presented at the stations.

Other objects and advantages of the invention will become apparent from the following detailed description of the preferred embodiment shown in the accompanying drawings in which:

Figure 1 is a plan view of a machine tool embodying the features of the invention.

Fig. 2 is a diagrammatic view showing the relationship between the various operating, driving and control elements of the machine.

Fig. 3 is an end view of the work support indexing mechanism.

Fig. 4 is a longitudinal sectional view of the work support taken in a plane substantially on the line 4—4 of Fig. 6.

Fig. 5 is a perspective view of the actuating cam mechanism for turning the work holders.

Fig. 6 is a transverse sectional view of the work support taken in a vertical plane substantially on the line 6—6 of Fig. 1.

Fig. 7 is a sectional view taken in a plane substantially on the line 7—7 of Fig. 6.

Fig. 8 is a view, partly in section, of a workpiece of the type on which the machine is adapted to operate.

While the invention is susceptible of various modifications and alternative constructions, we have shown in the drawings and will herein describe in detail the preferred embodiment, but it is to be understood that we do not thereby intend to limit the invention to the specific form disclosed, but intend to cover all modifications and alternative constructions falling within the spirit and scope of the invention as expressed in the appended claims.

In carrying out the invention, the improved work support is constructed in the form of a turret 10 herein shown as mounted for rotation about a horizontal axis. The turret is arranged to carry a plurality of rotatable work holding fixtures or chucks 11 located at equal distances from its rotational axis and uniformly spaced apart circumferentially. Indexing means 12 (Figs. 2 and 3) is provided for rotating the turret 10 step-by-step to advance the work holders in succession through a series of stations including a loading station L (Fig. 6) at which the workpieces are placed in the holders, a plurality of working stations W1, W2 and W3 at which machining operations are performed, and an unloading station U at which the finished workpieces are removed from the holders.

To enable machining operations to be performed on different areas of a workpiece in a single passage through the machine stations, novel means is provided for turning each work holder 11 through a predetermined angle in its advance from station to station and for locking it in a fixed position while located at a station. More particularly, each work holder 11 is provided with means adapted to be conditioned in one indexing step of the turret to rotate the holder in a subsequent indexing step of the turret. In the exemplary form herein disclosed, each work holder is turned in its advance from one station to another so that a different side of the workpiece is presented at each successive station.

For purposes of illustration, the invention has been shown and will be described herein as embodied in a double end or opposed head drilling machine for drilling small, radially disposed holes 15 (Fig. 8) in the heads of hexagon head cap screws 16. In the particular machine illustrated, two such holes are drilled simultaneously from opposite sides of the head, the holes meeting in a central recess 17 in the screw head to permit the insertion of a locking wire or the like.

Referring to Figs. 1 and 2, the machine selected to illustrate the invention comprises generally a rigid base or frame 20 having upstanding brackets 21 and 22 at opposite ends supporting a tubular member 23 in a horizontal position. The member 23 serves as a support for the turret 10 and as a support and guide for a pair of reciprocable spindle heads 24 and 25 disposed on opposite sides of the turret for movement toward and from the same.

In the exemplary machine the spindle heads 24 and 25 are alike. Each comprises a central hub portion 26 slidably mounted on the member 23 and having three radially projecting arms 27. The outer end of each arm is formed to provide a bearing 28 for a rotatable tool spindle 29. The corresponding spindles of the opposed heads are alined axially at the working stations W1, W2 and W3 and each carries a tool 30, such as a drill, at its inner end.

The spindles 29 of the heads 24 and 25 are driven by electric motors M and M' mounted on the machine frame. For this purpose one of the spindles 29, preferably the center spindle, is formed with an extension 31 having a splined connection with a driving sleeve 32 (Fig. 2) journaled in an upright portion 33 of the machine frame. The splined connection permits the spindle to move axially with the head while maintaining the rotary driving connection with the sleeve. A V-belt 34 provides the driving connection from each sleeve 32 to its associated motor M or M' and the two companion spindles of each head are driven from the central spindle through the medium of V-belts 35 and 36.

The heads 24 and 25 are advanced simultaneously to feed the tools 30 to workpieces carried on the turret 10 by cams 40 fast on a shaft 41 journaled in the brackets 21 and 22 and extending axially through the tubular supporting member 23. One of the cams 40 is disposed at the rear of each of the heads for cooperation with push rods 42 anchored in the heads and projecting rearwardly therefrom. The shaft 41 is driven by a motor M'' through the medium of a worm 43 and worm wheel 44. As shown in Fig. 1, the worm, worm wheel and one of the cams 40 are enclosed in a housing 45 forming a part of or rigid with the bracket 21. The other cam 40 is enclosed in a similar housing 46 associated with the bracket 22 at the other end of the frame.

The heads 24 and 25 are retracted from the work support by coiled compression springs 47 and 48 encircling the supporting member 23. The spring 47 is interposed between the forward end of the hub 26 of head 24 and a collar 49 (Fig. 4) abutting a shoulder presented by an enlarged section 50 of the member 23. The spring 48 is similarly interposed between the forward end of the hub 26 of head 25 and a collar 51 abutting one end of the work support indexing mechanism 12 as shown in Fig. 4.

The rate of movement of the heads 24 and 25 in advance and retraction is dependent upon the rate of rotation of the shaft 41 and the contour of the cams 40. It will be evident that various rates of advance and retraction such as rapid approach, slow feed and rapid return can be obtained very readily by appropriately shaping the cams 40. In the present instance both cams are alike in form and, as they are fast on the same shaft, the heads 24 and 25 advance and retract together, executing one complete cycle in each revolution of the shaft 41.

Before entering into a description of the means for turning the work holders 11 with which the invention is primarily concerned, the construction of the work support and the manner in which the work holders are mounted thereon will first be described. In general, the work support or turret 10 carries the work holders 11 which hold the workpieces or cap screws 16 in position to be operated on simultaneously by opposed tools 30. As indicated heretofore, the turret is arranged to be indexed step-by-step to present the work holders and the workpieces held therein in succession at the loading station L, the working stations W1, W2 and W3 and the unloading station U. It will be understood, of course, that the turret can be arranged for use with any desired number of working stations.

Referring more particularly to Figs. 4 and 6, the turret 10 as herein shown, comprises a generally cylindrical shell or drum 55 having one end closed by a rigid end wall 56. An annular flange 57 projecting from the inner face of the wall 56 axially of the drum forms a seat for a bearing sleeve 58 adapted to rotatably support the drum on the stationary tubular member 23.

The other end of the drum 55 is closed by a circular plate 60 bolted or otherwise rigidly secured to a flange 61 integral with the member 23. The plate 60 is dimensioned to fit snugly into the open end of the drum for supporting and guiding the latter in its rotation. A guide ring 62 rigidly attached to the end of the drum as by cap screws 63 engages in a peripheral notch 64 in the outer face of the plate 60 to hold the drum and plate securely in assembled relation without interfering with the rotation of the drum.

The drum 55 provides support for the rotary workholders 11 which, in this instance, are mounted around the periphery of the drum with their axes substantially perpendicular to the axis of the drum. In the particular form shown, each work holder comprises a tubular body 70 journaled intermediate its ends in a bushing 71 seated in a recess in the periphery of the drum 55. The inner end of the body is rotatably supported by a bearing 72 bolted or otherwise removably secured to the inner face of the end wall 56.

Seated in the projecting outer end of the body 70 is a removable socket member 73 suitably recessed to hold the particular type of workpiece upon which the machine is intended to operate. The particular socket member illustrated is designed to hold the cap screw 16 and to this end is formed with a central recess opening into a hexagonal socket for the reception of the shank and head of the workpiece respectively. Radially disposed openings around the socket provide for the entry of the drills 30 to the work.

As herein shown the socket member 73 is generally cylindrical in form and is dimensioned to fit snugly into the tubular body 70. A pin or lug 74 projecting radially from the member 73 and engaging in a notch in the body 70 prevents relative rotation of the parts and thus locates the socket member in fixed relation with respect to the work holder. A collar 74' threaded on the outer end of the body 70 engages a peripheral flange 73' integral with the socket member to hold the parts in assembled relation and yet permits convenient interchange of sockets for holding workpieces of different sizes and shapes.

The workpieces are effectually retained in the sockets while located at the working stations by spring pressed plungers 75 one of which is provided at each working station. The forward end of each plunger is recessed for the reception of a ball 76 adapted to seat in the central recess 17 of the workpiece and thus aid in accurately locating the same. Support for the plungers is provided by an arcuate bar 77 suitably mounted on the machine frame 20. To guide the work holders and workpieces into operative engagement with the plungers, each plunger is fitted with an arcuate guide strip 78 extending in the direction of the workpieces. A spring 79 acting on the inner end of each plunger 75 urges the plunger and its associated guide strip toward the work.

Means is provided for automatically ejecting the workpiece from each work holder as the holder is advanced to the unloading station. The ejecting means as herein shown, comprises a plunger 80 slidably mounted in the tubular body 70 and having an ejecting pin 81 positioned to engage the inner end of the workpiece held in the socket 73. A compression spring 82 interposed between the inner end of the socket 73 and the adjacent end of the plunger urges the latter outwardly of the body against a cam 83 integral with or rigidly secured to the stationary supporting member 23. The cam 83 is shaped so as to force the plunger inwardly of the body and thus push the workpiece from the socket as the work holder advances from the last working station to the unloading station.

The improved means for turning the work holders about their individual axes to enable the machine to drill holes in all sides of the workpieces in a single passage therethrough, is operated in timed relation with and preferably as an incident to their advance from station to station. When incorporated in a machine for operating on hexagonal workpieces, the turning means is arranged to rotate the work holders in steps of sixty degrees and to lock the holders rigidly against rotation while positioned at the stations.

The work holder turning means as herein shown, comprises two groups of stationarily supported cams 85 and 86 (Fig. 5) adapted to coact with cam engaging members provided on each of the work holders. The cam engaging means preferably comprises two members 87 and 88 (Figs. 4 and 7) positioned to engage the cams of the two groups alternately. The cams 85 and 86 are in the form of arcuate strips projecting from the inner face of the supporting plate 60 and having inclined leading cam surfaces 89 and 90 merging into elongated locking surfaces 91 and 92 disposed substantially parallel to the face of the plate 60.

As will be seen by reference to Fig. 5, the cams 85 and 86 are arranged in two circular groups concentric with the axis of the plate 60 and turret 55. The cams 85 forming one such group are spaced farther from the turret axis than the cams 86 forming the other group. Moreover, the cams of the two groups are alternately interspersed and uniformly spaced apart circumferentially of the supporting plate.

The cam engaging members 87 and 88 provided on each holder body 70 are spaced apart axially thereof for cooperation with the two groups of cams 85 and 86. As herein shown, the members 87 and 88 are formed integral with the body 70 and are generally triangular in shape. The members are dimensioned so that their flat sides 93 and 94 are adapted to slidably engage the locking surfaces 91 and 92 of the cams to accurately position the supported work pieces with respect to the tools and to prevent any rotative movement of the work holders while located at the machine stations.

To enable the members 87 and 88 to turn as well as lock the work holders, they are positioned with their side edges faced at predetermined different angles. In this instance, the side edges are faced sixty degrees apart as shown in Fig. 7. Thus, the triangular tip portion defined by adjacent sides of one member is centered over and projects substantially beyond the side of the companion member. Due to the staggered arrangement of the cams and cam engaging members, one of the members acts in each indexing step of the turret to condition the other member for turning the work holder in a subsequent indexing step of the turret. In the exemplary embodiment, the work holders are turned in each indexing step of the turret. Thus as the turret is indexed to advance a work holder from the position shown in Fig. 7, the side edge 93 of the member 87 slides along the locking surface 91 of the cam 85 until the tip portion of the member 88 defined by the side edges 94 engages the inclined leading face 90 of the cam 86. Upon further advance of the work holder, the member 88 rolls over the surface 90 to bring the edge 94 into mating engagement with the locking surface 92 of the cam 86. In this way the work holder is turned to the required position and effectually locked therein. The turning and locking operation is repeated in each indexing step of the turret with the members 87 and 88 of adjacent work holders acting alternately on successive cams 85 and 86.

The indexing of the turret 10 is effected by the indexing mechanism 12 in timed relation with the feed and advance movements of the heads 24 and 25. The indexing mechanism, as herein shown, comprises an oscillating member formed by a pair of disks 100 and 101 arranged in spaced parallel relation and connected together by a tubular central hub portion 102. The hub 102 is fitted with a bearing 103 for rotatably supporting the disk assembly on the stationary member 23. A ring 104 secured to the outer face of the turret end wall 55 concentric with the axis of the turret supports and guides the peripheral edge of the disk 100. The stop collar 51 for the head returning spring 48 heretofore described abuts against the end of the bushing 103 and the outer face of the disk 100 to hold the same firmly against the ring 104.

Pivotally supported between the disks 100 and 101 on opposite sides of the central bearing are a pair of pawls 105 (Fig. 3) pivotally supported by pins 106 extending through the disks. The pawls are yieldably urged by springs 107 into operative engagement with dogs 108 rigidly mounted on the ring 104 and projecting inwardly therefrom between the disks 100 and 101. The arrangement is such that the pawls coact with the dogs to advance the drum 55 when the disk assembly is rocked in a clockwise direction as viewed in Fig. 3. Springs 107 yield to permit the pawls to clear the dogs in the return movement of the disk assembly.

The turret advancing or indexing movement is imparted to the disk assembly through the medium of a linkage driven from the feed shaft 41 while return movement of the assembly is effected by a suitable spring 109. The linkage, as herein shown, comprises a tubular rock shaft 110 extending generally parallel to the supporting member 23 and suitably journaled on the machine frame. A crank arm 111 fast at one end of the rock shaft is connected by a link 112 and pin 113 with the disk 100. A crank arm 114 fast on the other end of the rock shaft carries a follower roller 115 adapted to coact with a cam 116 carried by the feed shaft 41. The cam 116 is so shaped and oriented with respect to the feed shaft 41 that the indexing of the turret takes place in the interval during which the heads 24 and 25 are in retracted positions.

Means is provided for locking the turret in fixed position between indexing cycles to insure proper positioning of the work holders at the machine stations. For this purpose, a locking bar 117 is mounted for endwise movement axially of the tubular rock shaft 110. The end of the bar adjacent the turret is shaped to engage in suitable notches 118 formed in the periphery of the ring 104 as shown in Figs. 2 and 3. A follower 119 carried at the other end of the locking bar is adapted to coact with a cam 120 fast on the feed shaft 41 and a spring 121 acting on the follower 119 yieldably urges the bar into locking position from which it is withdrawn by the action of the cam in the indexing portion of the machine cycle.

The exemplary machine is adapted for continuous operation. Thus, while the motor M" is running, the turret 10 is indexed intermittently and between each indexing step the heads 24 and 25 are advanced and retracted. The attendant is only required to place a workpiece in the work holders 11 as these holders are presented at the loading station as shown in Fig. 6. In the indexing of the turret the workpieces are advanced step-by-step in each machine cycle and presented in succession at working stations W1, W2 and W3 at which the tools 30 perform the required machining operations. Finally as each work holder approaches the unloading station, the work is ejected by the ejecting plunger 80.

In their advance from one station to another, each work holder is turned about its own axis through an angle effective to present a different side of the workpiece at each station. Thus, at the first working station holes 15 are drilled in two opposed sides of the workpiece 16. In its advance to the second working station, the work holder is turned through an angle of sixty degrees thus presenting two other sides of the workpiece for action. The remaining two sides of the workpieces are similarly presented for action at the third working station, thus enabling the machine to complete the drilling of all six sides of the workpiece in a single passage through the machine.

It will be apparent from the foregoing that the invention provides a work support of novel and improved construction adapted for use with machine tools of the multi-station type. The improved work support is adapted to carry workpieces from station to station and to automatically turn the same so as to present a different side for action at each station. In addition to turning workpieces for their proper presentation at the machine stations, the mechanism is further adapted to position them accurately and to rigidly lock them in fixed position while located at the station. The improved work support is of simple and rugged construction yet efficient and reliable in operation. Moreover, it materially simplifies the machining of multi-sided workpieces and substantially increases the productive capacity of the machine in which it is incorporated.

We claim as our invention:

1. In a machine tool having a loading station, a plurality of working stations and an unloading station, the combination of a rotary work support, a plurality of work holding fixtures disposed in uniformly spaced relation around the rotational axis of the work support, each of said fixtures being mounted for rotation about an axis substantially perpendicular to the axis of the work support, indexing means operable to advance the work support step-by-step to present the fixtures successively at the loading, working and unloading stations, a stationary plate disposed at one side of the work support, a plurality of arcuate cams on one face of said plate, said cams being arranged in two generally circular groups spaced at different distances from the axis of the work support, and a pair of cam engaging members rigid with each of said fixtures and spaced apart axially thereof for cooperation alternately with the cams of said two groups, said cams and said members being shaped so as to turn the fixtures through a predetermined angle as an incident to the indexing of the work support and to lock the fixtures against rotation while presented at the working stations.

2. In a machine tool having a plurality of working stations, the combination of a rotary work support, a plurality of work holders rotatably mounted on said support, said holders being arranged in a circular series and spaced approximately sixty degrees apart, indexing means operable to advance the work support step-by-step in one direction to present the fixtures successively at the working stations, a plurality of stationarily supported cams arranged in generally circular configuration at one end of the work support with alternate cams spaced at different distances from the axis of the support, a pair of triangular cam engaging members rigid with each work holder and spaced apart axially thereof for cooperation respectively with said alternate cams in the rotation of the work support, each of said cams being shaped to impart a rotative step to a cam engaging member and its associated fixture in the initial movement of the work support and having a generally flat surface of substantial length adapted to coact with a side surface of the triangular member to lock the fixture against rotation while presented at a working station.

3. A work supporting structure comprising, in combination, a stationarily supported shaft, a turret mounted for rotation on said shaft, indexing means for rotating said turret step-by-step in one direction, a cam supporting plate fixed to said shaft adjacent one end of the turret, a plurality of arcuate cams on said plate arranged in a circular series about the rotational axis of said turret with alternate cams of the series set inwardly from the companion cams, a plurality of work holders mounted on said turret for rotation relative thereto, and a pair of cam engaging members on each of said work holders spaced apart for cooperation respectively with alternate ones of said cams in the unidirectional rotation of said turret, said members being shaped to impart step-by-step rotative movement to the associated work holder during the rotation of said turret and to lock the holder in a fixed position at the end of each step.

4. In a multi-station machine tool, in combination, a rotatable turret, a plurality of work holding fixtures mounted on the turret, indexing means for rotating said turret step-by-step to advance the work holding fixtures from station to station, each of said work holders comprising a member journaled on the turret and having one end projecting radially therefrom, means carried by said member operative in the rotation of said turret to turn the member through a predetermined angle, a work holding socket removably seated in the member, and a cap on the projecting end of the member holding said socket in place, said cap being threaded to the member to permit convenient removal and replacement of said socket without disturbing the other parts of the work holder.

5. A work supporting structure comprising, in combination, a rotatably mounted turret, indexing means for turning said turret step-by-step in one direction about its rotational axis, a cam supporting member fixed to said shaft, a plurality of arcuate cams on said plate arranged in a circular series about the rotational axis of said turret with alternate cams of the series set inwardly from the companion cams, all of said cams having surfaces facing axially, a plurality of work holders mounted on said turret for rotation relative thereto about axes angularly spaced around and extending transversely of said turret axis, and a pair of cam engaging members mounted on and rotatable with each of said work holders about the holder axis and angularly spaced relative to each other for cooperation respectively with alternate ones of said cams in the unidirectional rotation of said turret, said members being shaped to impart step-by-step rotative movement to the associated work holder during the rotation of said turret and to lock the holder in a fixed position at the end of each step.

6. A work supporting structure comprising, in combination, a rotatably mounted turret, indexing means for turning said turret step-by-step in one direction about its rotational axis, a cam supporting member stationarily mounted adjacent the turret, a plurality of arcuate cams on said member arranged in a circular series about said turret axis with alternate cams of the series set inwardly from the companion cams, a plurality of work holders mounted on said turret for rotation relative thereto, and a pair of coaxially arranged cam engaging members on each of said work holders angularly spaced relative to each other for cooperation respectively with alternate ones of said cams in the unidirectional rotation of said turret, said members being shaped to impart step-by-step rotative movement to the associated work holder during the rotation of said turret and to lock the holder in a fixed position at the end of each step.

JOSEPH J. CORRIGAN.
FRED T. RINEHART.